Dec. 20, 1966   W. S. EVERETT   3,292,661
FLUID SURGE DAMPENER

Filed April 1, 1964   2 Sheets-Sheet 1

INVENTOR.
WILHELM S. EVERETT
BY *Elliott & Pastoriza*
ATTORNEYS

Dec. 20, 1966 W. S. EVERETT 3,292,661
FLUID SURGE DAMPENER

Filed April 1, 1964 2 Sheets-Sheet 2

INVENTOR.
WILHELM S. EVERETT
BY Elliott & Pastoriza
ATTORNEYS

** 3,292,661
FLUID SURGE DAMPENER
Wilhelm S. Everett, 126 W. Santa Barbara St.,
Santa Paula, Calif. 93060
Filed Apr. 1, 1964, Ser. No. 356,419
7 Claims. (Cl. 138—26)**

The present invention relates to dampening components for liquid lines, wherein the components primarily serve the function of attenuating unusual pressure surges which tend to occur as a result of a sudden change in liquid flow conditions. Thus, the present invention is directed in part towards applications in which water "hammer" or equivalent high pressure surges may occur as a consequence of a valve closure, a pump stoppage or failure, or the like.

Conventional pulsation dampeners exist of the gas-water interface type in which the changes in fluid pressure are dampened somewhat by the compression and expansion of the air or other gas in the dampening vessel. The present invention is directed towards an improvement of this type of gas-water interface dampener whereby such dampener may be substantially more efficient and effective without any increase in size.

With the foregoing in mind, it is an object of the present invention to provide a liquid pulsation dampener of the gas-water interface type for the elimination of water hammer and equivalent surge pressure conditions wherein the surge energy is not only absorbed through gas compression, but also through the inherent construction of the pulsation dampener as such.

Another object of the present invention is to provide an improved liquid pulsation dampener which may be effectively used to attenuate liquid pressure surges and thereby eliminate the possibility of pipeline bursting, recycle surges, and other attendant problems which may result from liquid pressure surges and the related vibration, chatter, and high pressures caused within the system.

Another object of the present invention is to provide a fluid pulsation dampener that has a durable and rugged construction requiring substantially no maintenance throughout a long period of life.

A still further object of the present invention is to provide a liquid pulsation dampener embodying an efficient and effective swirl chamber for co-functioning with the gas as a second means of absorbing energy of surges from the fluid line.

Still a further object of the present invention is to provide a liquid pulsation dampener which may be fabricated economically and sized conveniently to meet varying fluid line pressure conditions.

Yet still a further object of the present invention is to provide a liquid pulsation dampener which may be constructed in one embodiment such that the surge energy is absorbed during withdrawal of the fluid and in another embodiment (with only minor changes) wherein the surge energy is absorbed by entry of the fluid into the vessel.

These and other objects and advantages of the present invention are generally attained by providing a liquid pulsation dampener for connection in a liquid conduit subject to surges; the pulsation dampener consists of a closed vessel which has swirl means supported therein. The swirl means define a circular chamber of hour-glass cross-section, which includes a neck portion.

A first passage means communicates at one end with the neck portion of the swirl chamber; a second passage means communicates at one end with a peripheral portion of the interior of the swirl chamber. One of said passage means has its other end communicating with the conduit, while the other of the passage means has its other end communicating with the interior of the closed vessel.

Depending upon the application of the pulsation dampener, that is, whether energy should be absorbed upon the intake or withdrawal of liquid from the pulsation dampener, the first passage means would have its other end communicating with the interior of the vessel and the second passage means would communicate with the conduit, respectively, or vice versa, assuming the second condition.

In a preferred embodiment, the swirl chamber has disposed therein a vortex initiating member or bullet shaped structure which assists in creating the vortex and limiting the interior radius thereof. As a further feature or improvement of the present invention, it is also desirable to include in the second passage means a vane which assists in the peripheral formation of the vortex.

The foregoing and other features of the invention will become clearer as the specification proceeds. Thus, a better understanding of the present invention will be had by reference to the drawings, showing merely two illustrative embodiments and in which.

Figure 1:
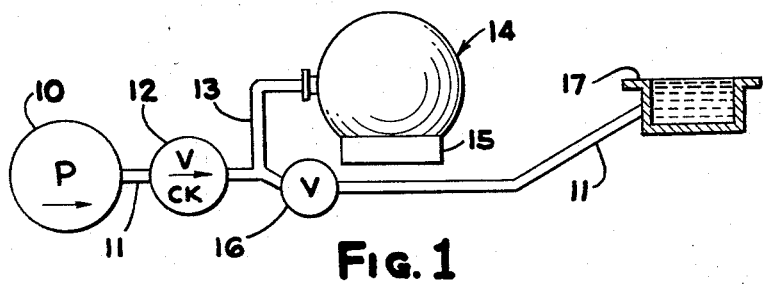
FIGURE 1 is a schematic fluid line system disclosing the location therein of one embodiment of the liquid pulsation dampener according to the present invention.

Referring now to the drawings, FIGURE 1 illustrates what might be termed a typical "shut-down" application in which a pump 10 is pumping liquid into a line 11 through a check valve 12. On the other side of the check valve 12 is located a branch line 13 which connects with the pulsation dampener 14, according to the present invention. The pulsation dampener 14 may be supported on a base 15. The main line continues through a conventional valve 16 into a reservoir 17, for example. Of course, in order to pump fluid from the pump 10 to the reservoir 17, the liquid in the line 11 must be maintained under a certain degree of pressure and have a certain flow velocity. In such a system, in the event the pump is shut down or a pump failure occurs, it will be evident that water or other liquid in the line 11 will have an amount of kinetic energy urging it to momentarily continue to flow upwardly towards the reservoir 17 from the check valve 12. Thus, a fluid column separation tends to occur with resultant fluid pressure surges responsive to the initial vacuum condition created by the column separation.

With the foregoing in mind, the liquid pulsation dampener 14 may be described in further detail. The dampener 14 includes a spherical shell 18 with try cocks or valves 19 for indicating fluid level within the unit. The function of these try cocks will become clearer as the specification proceeds. The shell 18 may also be appropriately provided with a lifting lug 20 and a flow valve 21.

The dampener 14 connects with the branch line 13 through a tangential nozzle 22 provided with a connecting flange 23. In order to make a tangential connection with the swirl chamber provided within the vessel 14, the nozzle or passage means 22 is provided with a bend at 24. In accordance with a feature of the present invention, the nozzle 22 has disposed therein a rectangular plate 25 extending diametrically across the nozzle 22 and connected to the interior sidewalls thereof. The plate 25 forms a vane in assisting in creating a vortex within the swirl chamber to be hereafter described.

In this regard, the nozzle 22 connects at 26 with a swirl creating means or a swirl chamber 27. The chamber 27 embodies a cylindrical wall member 28 forming a peripheral closure for an upper dish-shaped header 29 and a lower dish-shaped header 30. The headers 29 and 30, together with the cylindrical sidewall 28 define an interior swirl chamber of hour-glass cross-section. Attached centrally to the upper header 29 and projecting downwardly towards the lower header 30, is a vortex initiator or eye bullet member 31 which extends into an eye nozzle 32 formed integrally with an extending downwardly from the central portion of the header 30. The eye nozzle 32 is supported by lower base struts 33 as is the outer sidewall 28 of the swirl chamber 27, by struts 34.

If desired, a drain cock 35 may be provided at the bottom of the vessel 18 within the base member 15, and an appropriate access hole may be provided in the base member 15 (not shown) for purposes of draining liquid from the interior of the vessel.

When fabrication of the pulsation dampener 14 is completed, it is usually shipped in an empty condition for installation in a particular system line, for example, of the type shown in FIGURE 1. Thereafter, water is added through a fill opening in the top of the unit (not shown) until the proper fluid level is determined by the try cocks 19. If air entrainment or absorption occurs during operation, additional air may be added through the valve 21. Of course, air or another gas would be disposed in the vessel 18 in the volume unoccupied by the liquid water therein. The gas used would normally be air, although nitrogen may be used in instances in which air might otherwise combine with the particular liquid, for example, in the event it is not water.

In certain instances, in order to avoid any air absorption, a silicone liquid membrane may be formed over the water surface. Towards this end, silicone fluid is placed in the vessel and then water added in the same manner as heretofore outlined. Of course, the vessel must be designed such that in operation the fluid level never becomes low enough for air to enter into the bottom of the eye nozzle and to thereafter pass into the lines 13 and 11. Thus, it is important that the fluid level be at the proper point, as determined by the try cocks and as heretofore described.

In operation, once the surge dampener has been connected into the line and filled to a certain level with water so that a given air compression exists therein above the water level, the dampener is ready to perform its intended function.

Thus, assuming that the pump 10 should be shut down or fail in its operation, a vacuum condition would result as a result of the kinetic energy of the fluid in the line 11 continuing to force flow towards the reservoir 17 and create a column separation on the upward side of the check valve 12. As this condition occurs, the higher pressure in the vessel 18 (as a result of the compressed air therein) would force the water therein or other liquid upwardly through the eye nozzle 32 and then outwardly in the direction of an expanding volume to the tangential nozzle 22, and thereafter into the lines 13 and 11. Thus, the vacuum condition created by the liquid's tendency towards column separation would be prevented by filling of the gap occuring through the water coming from the vessel 14. Thereafter, the tendency to create a surge condition upon the related reverse flow of the fluid would be substantially eliminated by two factors: the inherent construction of the swirl chamber 27; and, the compressive force of the air within the vessel 18.

Thus, return flow or surge through the lines 11 and 13 into the vessel 14 through the tangential nozzle 22 would be characterized by two energy absorbing processes. First of all, as the fluid rebounded into the tangential nozzle 22, a vortex would be created particularly as a result of the vane 25 and the bullet member 31. The vortex would be reduced in volume towards the center of the hour-glass shaped vortex chamber until the liquid finally passed into the eye nozzle 32. During this process, of course, a substantial amount of energy of the kinetic energy of the fluid flows surge would be converted into fluid frictional heat and heat against the sidewalls of the surge chamber. Thereafter, after the fluid flowed out through the bottom of the eye nozzle 32, it would tend to compress the air or other gas within the vessel 14, whereby another portion of the kinetic energy would be converted into the work in such compression. The cycle would then again be repeated after the liquid again flowed back into the line with a minimum amount of resistance and aided by the gas pressure.

It also may be noted in the particular system (FIGURE 1) shown for illustrative purposes that an altitude switch might be mounted in the pulsation dampener 14 to sense the air pressure within the shell 18 and thereby give an indication of the fluid in the reservoir 17, since the air pressure would necessarily be proportional to the height or head of the liquid within the reservoir.

Figure 4:
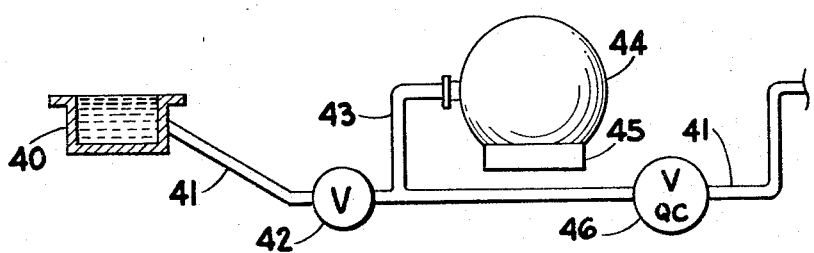
FIGURE 4 is a schematic representation of another fluid system embodying the second embodiment of the pulsation dampener according to the present invention.

In another embodiment, the pulsation dampener of the present invention might be constructed somewhat differently and embodied, for example, in the fluid system of FIGURE 4. Referring to that view, there is shown a reservoir 40 having a line 41 leading downwardly therefrom through a conventional valve 42. After passing through the valve 42, the line 41 connects with a branch line 43 leading to a pulsation dampener 44, according to the present invention, which may be mounted on the base 45. The main line thereafter passes through a closing valve 46, for example, to lead to a water cooler or the like, not shown. In the schematic system of FIGURE 4, closure of the "quick closing" valve 46 will cause a sudden pressure surge in the line 41 between the reservoir 40 and the valve 46. In order to avoid the possibility of damage to the line and connected instruments because of pressure surge, the pulsation dampener 44 in this instance is designed to allow the liquid or water from the line 41 to pass through the branch line 43 with a minimum amount of frictional resistance into the interior of the dampener; on the other hand, back flow through the line 40 into the line 41 must be with a maximum amount of resistance.

Figure 2:
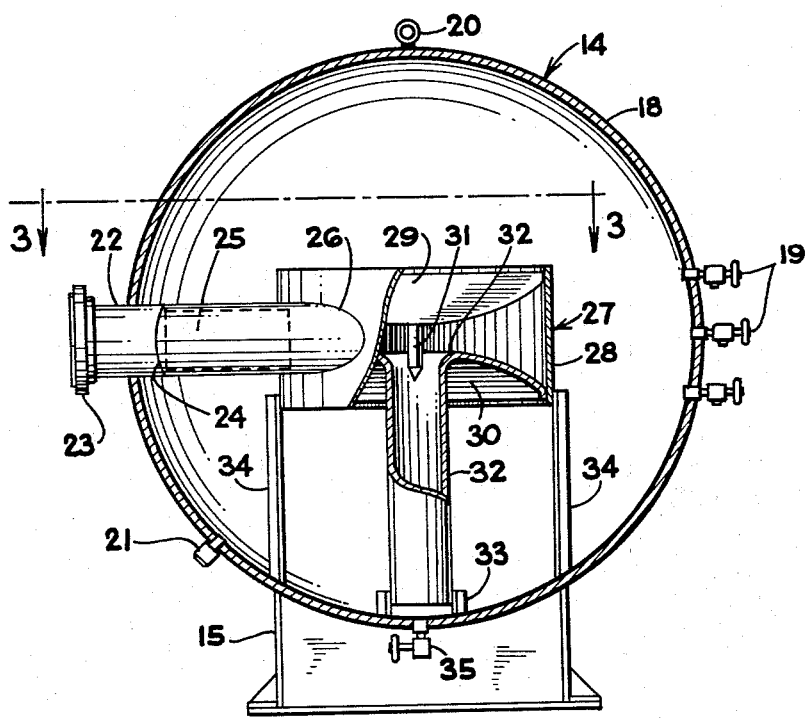
FIGURE 2 is an enlarged, partially sectional view of the pulsation dampener shown as part of the system of FIGURE 1.
Figure 3:
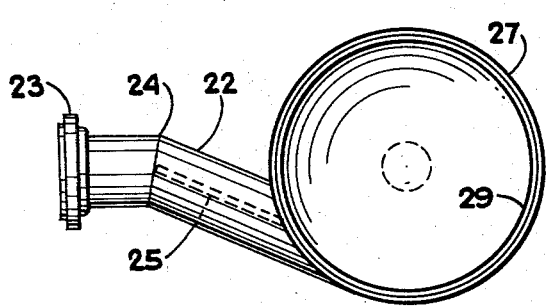
FIGURE 3 is a view taken in the direction of the arrows 3—3 of FIGURE 2 showing merely the swirl chamber and inlet passage, without showing the sidewalls of the enclosing vessel.
Figure 5:
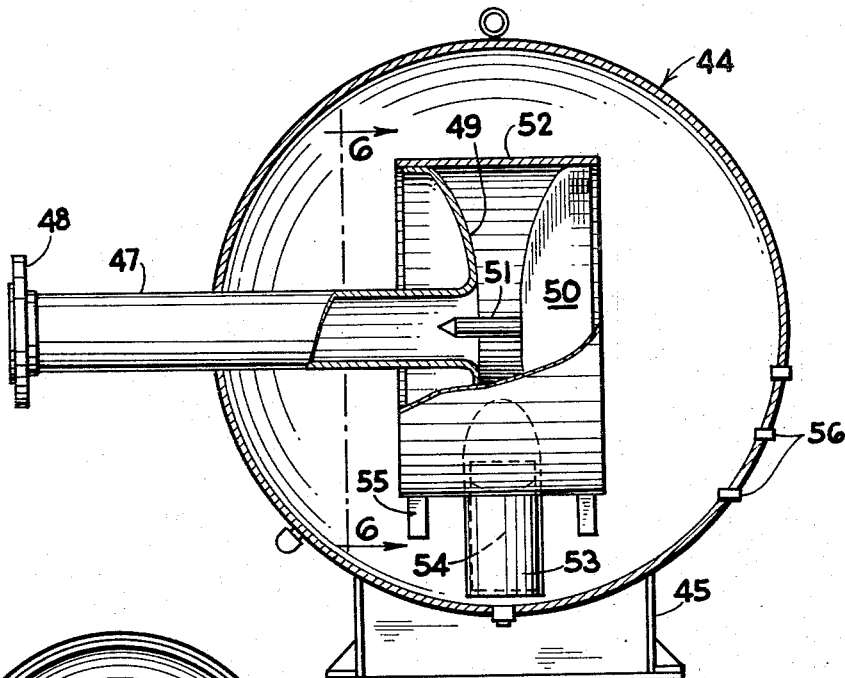
FIGURE 5 is an enlarged, partially sectional view of the liquid pulsation dampener shown in FIGURE 4; and, FIGURE 6 is a view taken in the direction of the arrows 6—6 of FIGURE 5, excluding any showing of the enclosed vessel or means of mounting thereto.

With the foregoing in mind, reference may now be had to FIGURE 5 showing the detailed construction of this embodiment of the pulsation dampener according to the present invention. In this instance, there is provided an eye nozzle 47 having a flange 48 for connection to the line 43. The nozzle 47 is integrally formed through the center of a header 49 and is in opposing relationship to another header 50. The header 50 has attached thereto a vortex initiator or eye bullet 51. The headers 49 and 50 are encircled by a cylindrical wall 52 to define a swirl chamber similar to that shown in FIGURE 2.

Also, a tangential nozzle 53 is provided which may have interposed therein, a vane 54. This construction may be similar to the tangential nozzle 22 and vane 25 of FIGURE 2. The tangential nozzle 53 in this instance, however, leads out into the interior of the closed vessel 44. Struts 55 may be provided for the purpose of supporting the swirl chamber within the enclosed vessel 44. Also, it is desirable to provide try cocks 56 similar to those of FIGURE 2. However, it is to be noted that in this embodiment, the try cocks are located at a lower level whereby the air pressure is less and therefore resists less the inlet of the fluid to the pulsation dampener in response to a pressure surge.

Figure 6:
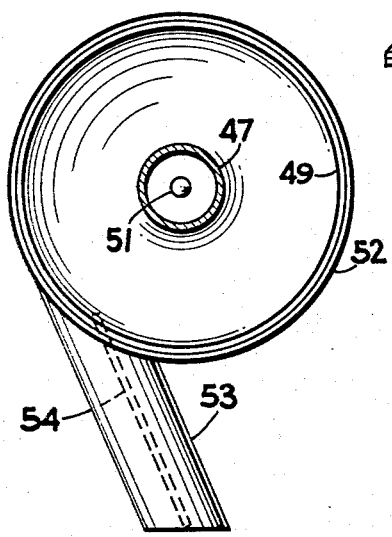

Thus, with the construction of FIGURES 4 through 6, the maximum resistance to flow occurs during the outlet of the fluid from the surge dampener 44, while the minimum resistance to the flow occurs during the inlet of fluid thereto. This embodiment of the pulsation dampener of the present invention is more adapted towards the system as shown in FIGURE 4.

It will be appreciated, however, that the pulsation dampener of the present invention may be embodied in various liquid systems, and the invention is not to be thought of as limited to the particular construction shown or limited in its usage to the particular systems illustrated schematically. It will also be appreciated that various changes in the method of fabrication, the details of construction, and the like, may be made without departing from the basic spirit and scope of the invention as set forth in the following claims.

What is claimed is:

1. A fluid surge dampener for connection in a conduit subject to surges, said fluid surge dampener comprising: a closed vessel; swirl means supported within said vessel, said swirl means defining a circular chamber of hour-glass cross-section and including a neck portion; a first passage means communicating between said neck portion and the interior of said vessel; a second passage means communicating between said conduit and said chamber, said second passage means extending sealably through said vessel; and, said vessel being designed to have said fluid therein to a fluid level such as to at least close off the free end of said first passage means.

2. A fluid surge dampener for connection in a conduit subject to surges, said fluid surge dampener comprising: a closed vessel; swirl means supported within said vessel, said swirl means defining a circular chamber of hour-glass cross-section and including a neck portion; a first passage means connected at one end to said conduit; a second passage means communicating at one end with the interior of said vessel; one of said passages having its other end communicating with the neck portion of said swirl chamber, and the other of said passage means having its other end communicating with the peripheral portion of said swirl chamber; an axially disposed bullet member extending through said neck portion of said swirl chamber into the one of said passage means communicating with said neck portion; said vessel being designed to have fluid therein to a level such as to close off the free end of said other passage means having said one end thereof extending into the interior of said vessel.

3. The combination, according to claim 2, and a diametrically extending flat vane disposed in the one of said passage means communicating with the peripheral portion of said swirl chamber.

4. A fluid surge dampener for connection in a conduit subject to surges, said fluid surge dampener comprising: a closed vessel; swirl means supported within said vessel, said swirl means defining a circular chamber of hour-glass cross-section and including a neck portion; a first passage means communicating between the neck portion of said swirl chamber and the interior of said vessel; a bullet member mounted on said swirl chamber and extending into said first passage means along the axis thereof laterally through said neck portion of said swirl chamber; a second passage means communicating between said conduit and the peripheral portion of said chamber, said second passage means being tangentially connected to said peripheral portion of said chamber; a vane member positioned diametrically within said second passage means, said vane member comprising a flat member tending to divide the fluid flow therethrough into two streams; said vessel being designed to have fluid therein to a level such as to at least close off the free end of said first passage means.

5. A fluid surge dampener for connection in a conduit subject to surges, said fluid surge dampener comprising: a closed vessel; fluid swirl means supported within said vessel, said swirl means defining a circular chamber of hour-glass cross-section and including a neck portion; a first passage means communicating between said neck portion and said conduit sealably through said vessel; a second passage means communicating between the peripheral portion of said swirl chamber and the interior of said vessel; a bullet member mounted on said swirl means and extending laterally through said neck portion of said swirl chamber axially into said first passage means; said vessel being designed to have said fluid therein to a level such as to close off the free end of said first passage means.

6. The combination, according to claim 5, in which a flat vane member is diametrically disposed in said second passage means so as to divide the flow therethrough, said vane being in position adjacent the connection of said second passage means to the peripheral portion of said swirl chamber.

7. The combination, according to claim 6, in which said second passage means communicates tangentially with the interior of said swirl chamber.

References Cited by the Examiner

UNITED STATES PATENTS

| 2,671,652 | 3/1954 | McCullough | 138—26 X |
| 2,896,862 | 7/1959 | Bede | 138—26 X |

LAVERNE D. GEIGER, *Primary Examiner.*

C. HOUCK, *Examiner.*